United States Patent
Shibata et al.

(10) Patent No.: US 8,510,311 B2
(45) Date of Patent: Aug. 13, 2013

(54) PATTERN SEARCH APPARATUS AND METHOD THEREOF

(75) Inventors: Tomoyuki Shibata, Tokyo (JP); Osamu Yamaguchi, Kanagawa (JP); Toshikazu Wada, Osaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 964 days.

(21) Appl. No.: 12/170,597

(22) Filed: Jul. 10, 2008

(65) Prior Publication Data

US 2009/0019044 A1    Jan. 15, 2009

(30) Foreign Application Priority Data

Jul. 13, 2007 (JP) ................................. 2007-183788

(51) Int. Cl.
    *G06F 17/30* (2006.01)
(52) U.S. Cl.
    USPC .......................................... 707/747; 707/737
(58) Field of Classification Search
    USPC .................. 707/600, 602, 737, 747, 999.006, 707/713, 749, 957
    See application file for complete search history.

(56) References Cited

U.S. PATENT DOCUMENTS

| | | | | |
|---|---|---|---|---|
| 5,668,897 | A * | 9/1997 | Stolfo | 382/283 |
| 5,802,509 | A | 9/1998 | Maeda et al. | |
| 6,236,749 | B1 * | 5/2001 | Satonaka et al. | 382/154 |
| 6,421,463 | B1 * | 7/2002 | Poggio et al. | 382/224 |
| 6,690,819 | B1 * | 2/2004 | Teraji | 382/147 |
| 6,785,672 | B1 * | 8/2004 | Floratos et al. | 707/748 |
| 7,796,885 | B2 * | 9/2010 | Dress et al. | 398/66 |
| 2001/0026634 | A1 * | 10/2001 | Yamaguchi | 382/118 |
| 2003/0128876 | A1 * | 7/2003 | Yamaguchi | 382/190 |
| 2004/0001608 | A1 * | 1/2004 | Rhoads | 382/100 |
| 2004/0019574 | A1 * | 1/2004 | Meng et al. | 706/15 |
| 2005/0120017 | A1 * | 6/2005 | Motoki | 707/5 |
| 2005/0283505 | A1 | 12/2005 | Fujimoto | |
| 2006/0126906 | A1 * | 6/2006 | Sato et al. | 382/118 |
| 2006/0193159 | A1 * | 8/2006 | Tan et al. | 365/49 |
| 2006/0253491 | A1 * | 11/2006 | Gokturk et al. | 707/104.1 |
| 2007/0003135 | A1 * | 1/2007 | Mattausch et al. | 382/159 |
| 2007/0286272 | A1 * | 12/2007 | Richards et al. | 375/238 |
| 2008/0000991 | A1 * | 1/2008 | Yin et al. | 235/494 |
| 2008/0059462 | A1 * | 3/2008 | Millett et al. | 707/6 |
| 2009/0307184 | A1 * | 12/2009 | Inouye et al. | 707/2 |

FOREIGN PATENT DOCUMENTS

| | | |
|---|---|---|
| JP | 07-093159 | 4/1995 |
| JP | 2006-011492 | 1/2006 |

OTHER PUBLICATIONS

Indyk, et al., Approximate Nearest Neighbors: Towards Removing the Curse of Dimensionality, In Proceedings of the 30th ACM Symposium on Theory of Computing (STOC'98), pp. 604-613, May 1998.

Datar, et al., Locality-Sensitive Hashing Scheme Based on p-Stable Distributions, In Proceedings of the 20th Annual Symposium on Computational Geometry (SCG2004), Jun. 2004.

Japanese Office Action for Japanese Application No. 2007-183788 mailed on May 8, 2012.

Ishibashi et al.; "Heirarchical Clustering Algorithm Using Locality-Sensitive Hashing".

* cited by examiner

*Primary Examiner* — Greta Robinson
(74) *Attorney, Agent, or Firm* — Turocy & Watson, LLP

(57) ABSTRACT

A pattern search apparatus includes a storage unit, a distribution acquisition unit, a hash function unit, a training unit, and a search unit. A cumulative probability distribution of the training pattern on an arbitrary axis is obtained, and hash function each of which divides a probability value are defined based on the cumulative probability distribution.

11 Claims, 5 Drawing Sheets

DIVISION AT CONSTANT PROBABILITY FROM
CUMULATIVE PROBABILITY DISTRIBUTION

PATTERN SEARCH APPARATUS AND METHOD THEREOF

CROSS-REFERENCE TO RELATED APPLICATION

This application is based upon and claims the benefit of priority from the prior Japanese Patent Application No. 2007-183788, filed on Jul. 13, 2007; the entire contents of which are incorporated herein by reference.

FIELD OF THE INVENTION

The present invention relates to a pattern search apparatus and a method thereof for searching a nearest neighbor pattern in a training pattern set at high speed using a hash function on an input pattern.

BACKGROUND OF THE INVENTION

A conventional approximate nearest neighbor search method using a hash function is disclosed in P. Indyk and R. Motwani, "Approximate Nearest Neighbors: Towards Removing the Curse of Dimensionality," In Proceedings of the 30th ACM Symposium on Theory of Computing (STOC'98), pp. 604-613, May 1998) and M. Datar, P. Indyk, N. Immorlica, and V. Mirrokni, "Locality-Sensitive Hashing Scheme Based on p-Stable Distributions," In Proceedings of the 20th Annual Symposium on Computational Geometry (SCG2004), June 2004). As shown in FIG. 5, these documents disclose that a training pattern set is projected on an arbitrary vector, a hash function for dividing an existence range on the vector at constant intervals is defined, and a nearest neighbor pattern is searched from limited nearest neighbor candidates in the training pattern set by a hash value of an input pattern. In FIG. 5, the horizontal axis shows a projected vector, the vertical axis shows the cumulative frequency of training patterns on this vector.

As shown in FIG. 5, stored patterns are projected on an arbitrary vector, and a hash function for dividing the existence range on the vector at constant intervals is used.

However, in a space area (hereinafter referred to as a bucket) obtained by division by the hash function, with respect to the training patterns existing in the bucket containing the input pattern as the search object, the number of patterns varies according to the distribution of the training pattern set, and in the bucket with a high training pattern density, a search time becomes long, and in the bucket with a low training pattern density, a ratio (hereinafter referred to as an error ratio) of errors of distances of the true nearest neighbor pattern and the obtained approximate nearest neighbor becomes high.

In the case where the training pattern does not exist in the bucket containing the input pattern as the search object, a search can not be made.

SUMMARY OF THE INVENTION

Accordingly, an advantage of the present invention is to provide a pattern search apparatus and a method thereof for enabling the speed-up of the search speed and the reduction of the error ratio.

In order to achieve the above-described advantage, a first aspect of the present invention is to provide a pattern search apparatus includes a storage unit configured to store a plurality of training patterns having d dimensions, a distribution acquisition unit configured to obtain a cumulative probability distribution representing a cumulative probability of existing probabilities of the respective training patterns on an arbitrary dimensional axis of the d dimensions, a hash function unit configured to obtain a hash function to convert a value of an arbitrary point in a distribution section on the arbitrary dimensional axis corresponding to, in the cumulative probability distribution, each probability section which is obtained by dividing the cumulative probability, to a hash value corresponding to each of the probability sections, a training unit configured to obtain hash values of the respective training patterns by using the hash function and to classify the respective training patterns into buckets corresponding to the hash values, and a search unit configured to obtain hash value of an input pattern by using the hash function and to search the training pattern most similar to the input pattern from the training patterns belonging to the bucket corresponding to the hash value of the input pattern.

DETAILED DESCRIPTION OF THE INVENTION

Hereinafter, embodiments of the present invention will be described with reference to the drawings.

(First Embodiment)

Hereinafter, a pattern search apparatus 1 of a first embodiment will be described with reference to FIG. 1 and FIG. 2.

Figure 2:
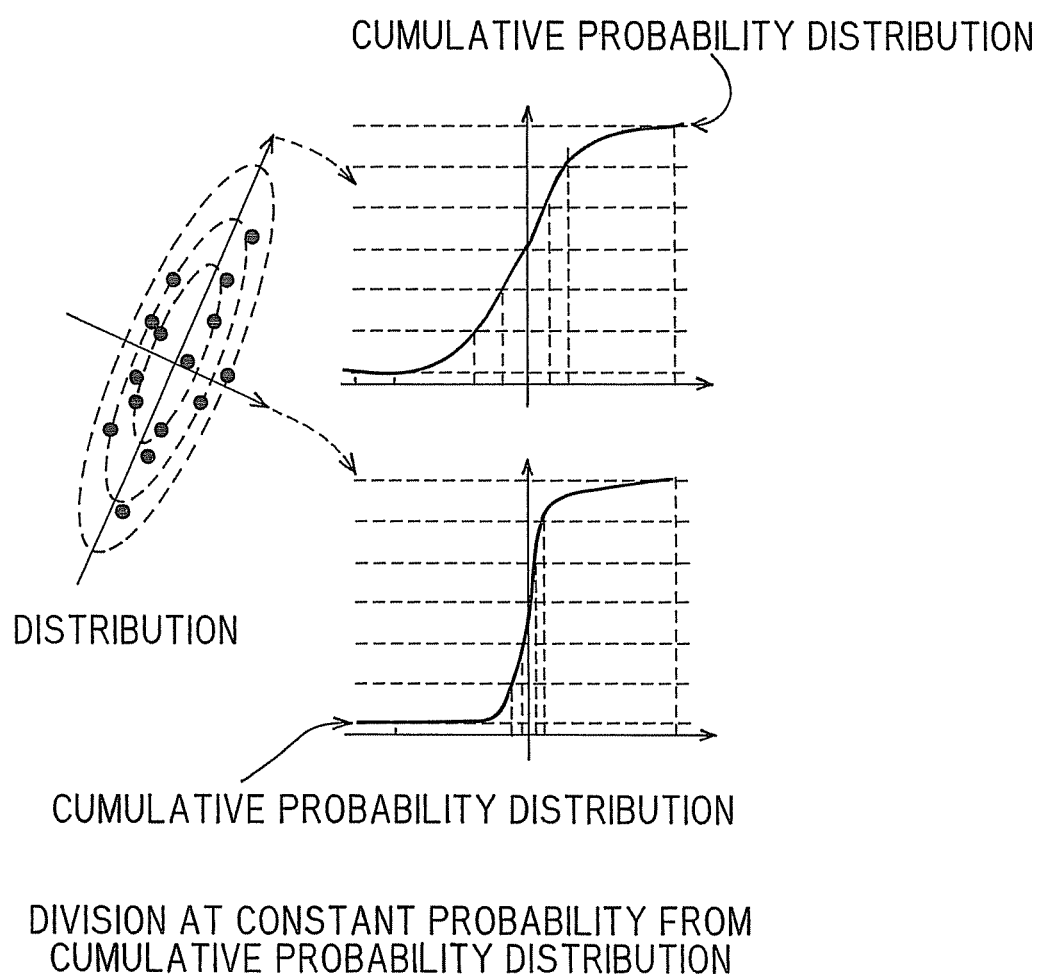
FIG. 2 is an explanatory view of the concept of the first embodiment.

As shown in FIG. 2, pattern search apparatus 1 of this embodiment has previously stored training patterns, which become search objects as a training pattern set. Here, it is assumed that the training pattern set can be represented by a normal distribution (Gaussian distribution).

The cumulative probability distribution of the training patterns on an arbitrary axis is approximated by a sigmoid function, and hash functions, each of which divides a probability value at constant intervals, are defined based on the cumulative probability distribution.

Then, when an unknown pattern is inputted, a sum of respective subsets of the training pattern set existing in the bucket is obtained by a hash value as the output of each hash function. A training pattern (hereinafter referred to as the nearest neighbor pattern) which is most similar to the input pattern is searched from the sum.

Pattern search apparatus 1 of this embodiment is used for pattern recognition, and can be applied to, for example, recognition of an object (e.g., face recognition) taken on an image or data mining.

Figure 1:
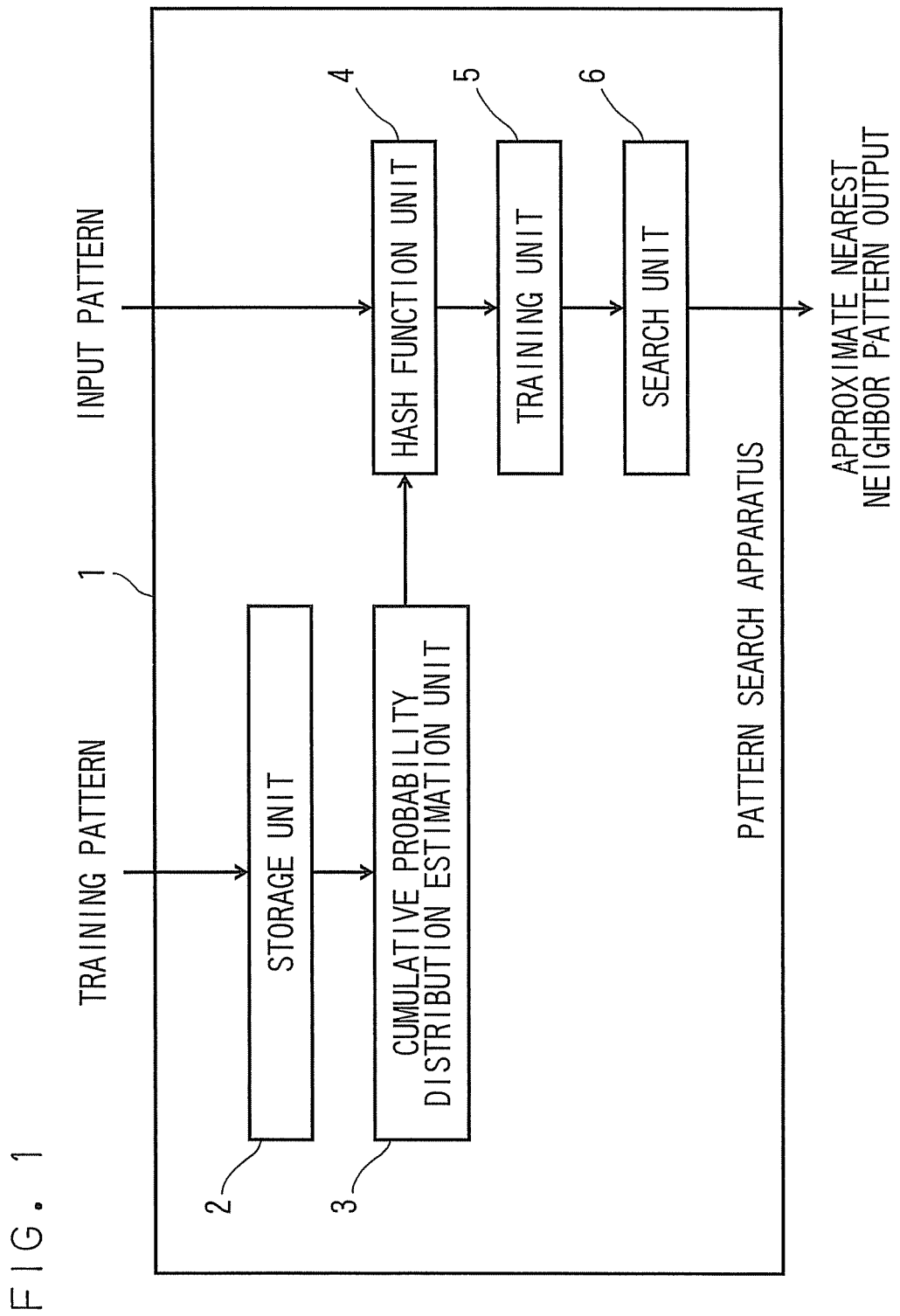
FIG. 1 is a block diagram showing a structure of a pattern search apparatus of a first embodiment of the invention.

FIG. 1 is a block diagram showing pattern search apparatus 1 of this embodiment.

Pattern search apparatus 1 includes a storage unit 2, a distribution acquisition unit 3, a hash function unit 4, a training unit 5, and a search unit 6.

Respective functions of units 2 to 6 described below can also be realized by a program stored in a computer-readable media which causes a computer to implement their functions.

Storage unit 2 has previously stored training patterns such as face images, which become search objects, as a training pattern set.

Then, the stored training patterns are sent to the distribution acquisition unit 3 and training unit 5.

The distribution acquisition unit 3 obtains a cumulative probability distribution on an arbitrary axis of the training pattern set stored in storage unit 2 by a principal component analysis.

In this embodiment, it is assumed that the training pattern set is a normal distribution (Gaussian distribution), and the cumulative probability distributions on all dimensions are obtained. In case the cumulative probability distribution on the d dimension is estimated and the distribution is obtained, it is approximated by a sigmoid function of following expression (1)

$$Ps_d = \frac{1}{1 - e^{-(x-\mu)/a}} \qquad (1)$$

Here, μ denotes a mean value, and α denotes a standard deviation. With respect to the two parameters, a mean value and a standard deviation of the training pattern set are used as the initial values, and optimization of fitting of the sigmoid function to the cumulative probability distribution is performed by the least squares approximation.

The respective acquired cumulative probability distributions are sent to hash function unit 4.

Hash function unit 4 obtains a hash function to divide each of the cumulative probability distributions obtained by the distribution acquisition unit 3 into n parts so that the probability values become uniform.

The hash function can be defined by following expression (2).

$$h_d(x) = \lfloor Ps_d(x)/\Delta \rfloor \qquad (2)$$

Here, Δ denotes a probability value of one bucket when a value area [0, 1] of Ps(x) is divided into n parts like [0, Δ], [Δ, 2Δ], ••• [(n−1) Δ, 1].

The hash function on each dimension is acquired and is sent to training unit 5 and search unit 6.

Training unit 5 distributes the respective training patterns belonging to the training pattern set to respective buckets corresponding to hash values as output values of the respective hash functions based on the training pattern set stored in storage unit 2 and the respective hash functions acquired by hash function unit 4, constructs subsets, and forms a list structure.

In the case where the dimension number of the pattern is D, and the hash function makes a division into n parts, Dn subsets are created in total.

The created subsets are sent to search unit 6.

First, an unknown pattern q, such as a face image, to be retrieved is inputted to search unit 6. Then, with respect to input pattern q, the most similar training pattern (that is, the nearest neighbor pattern) is searched from the training pattern set ALL.

The search is made based on the respective hash functions acquired by hash function unit 4 and the subsets created by training unit 5.

When input pattern q is made the input value, a subset $B_{iH}$ limited by hash value H as the output of the hash function can be defined by following expression (3).

$$B_{iH} = \{x | x \in ALL, h_i(x) = H\} \qquad (3)$$

Here, a sum of subsets obtained by m hash functions selected at random is made a nearest neighbor candidate C(q)

$$C(q) = \bigcup_{i=1}^{m} B_{iH}(q) \qquad (4)$$

At this time, when the nearest neighbor candidate C(q) is acquired, the number of contained buckets is made a multiplicity w(x), sorting is performed by this, and a distance between the maximum pattern and the input pattern is made a provisional distance z. When an $L_p$ distance between $x_1$ and $x_2$ is defined as $d_p(x_1, x_2)$, the provisional distance z is expressed by following expression (5).

$$z = d\left(q, \arg\max_{x \in C(q)} w(x)\right) \qquad (5)$$

Here, since a candidate x satisfying following expression (6) can not become the nearest neighbor, the candidate can be removed from the nearest neighbor candidate C(q).

$$\sum_{i=1}^{m} |q_i - x_i|^p > z^p \qquad (6)$$

Based on this property, a search refinement is performed by the following procedure.

At step 1, i is made 1.

At step 2, with respect to the respective elements in $C_{i-1}(q)$, a candidate satisfying the condition of expression (6) is removed, and an obtained candidate set is made $C_i(q)$. When i=m, advance is made to step 4. When $|C_i(q)|=1$, the element is made the nearest neighbor pattern and a stop is made.

At step 3, i is made "i+1", and return is made to step 2.

At step 4, distance calculation is performed for all candidates in $C_i(q)$ and the input pattern, and the training pattern to give the minimum distance is made the nearest neighbor pattern and a stop is made.

The finally acquired nearest neighbor pattern is outputted to the outside of the pattern search apparatus 1.

In the above embodiment, in search unit 6, the nearest neighbor candidate C(q) is rearranged by the multiplicity w(x), and a search may be made for only the upper b %.

In the above embodiment, although the sum of the subsets obtained by the hash functions in search unit 6 is made the nearest neighbor candidate C(q), a product set of the subsets obtained by the hash functions in search unit 6 or a sum near the product set is made the nearest neighbor candidate C(q) and a search may be performed.

According to the prefered embodiments of the invention, since the hash function to divide the probability value at constant intervals is defined from the cumulative probability distribution of the training patterns, the number of patterns in each bucket becomes almost constant, and it becomes possible to increase the average search speed at the time when the nearest neighbor solution is obtained and to reduce the error ratio.

(Second Embodiment)

A pattern search apparatus 101 of a second embodiment of the invention will be described with reference to FIG. 3.

Pattern search apparatus 101 of this embodiment is different from pattern search apparatus 1 of the first embodiment in the following two points.

The first different point is that in an orthogonal transformation unit 107, each training pattern of a training pattern set is projected on a subspace, is orthogonally transformed into a Euclidean distance in a vector space, and the orthogonally transformed training pattern is stored in a storage unit 102.

The second different point is that in a distribution acquisition unit 103, a cumulative probability distribution is acquired by weighting addition of sigmoid functions with respect to the respective training patterns.

Figure 3:
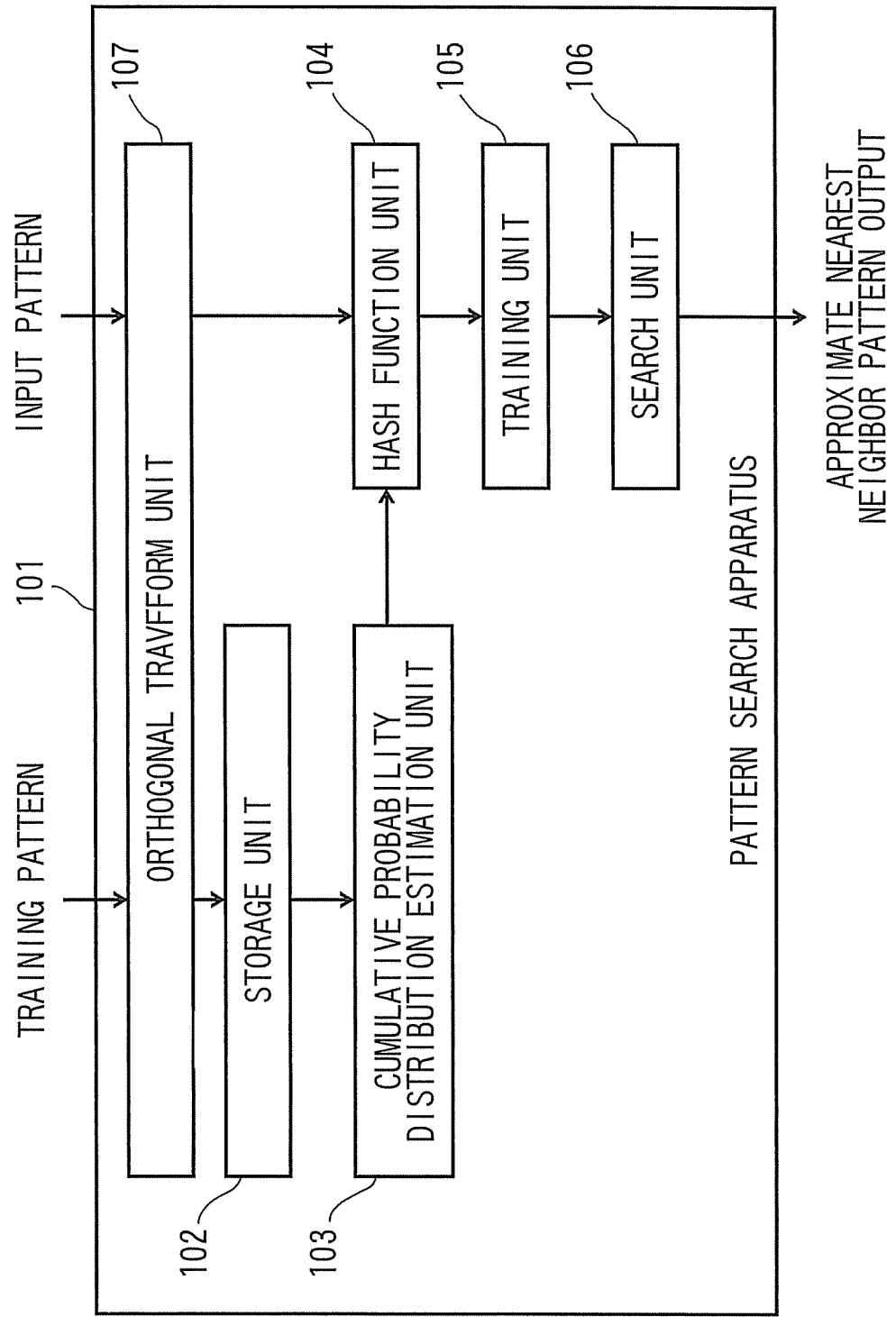
FIG. 3 is a block diagram showing a structure of a pattern search apparatus of a second embodiment of the invention.

FIG. 3 is a block diagram showing pattern search apparatus 101 of this embodiment.

Pattern search apparatus 101 includes storage unit 102, distribution acquisition unit 103, a hash function unit 104, a training unit 105, a search unit 106, and orthogonal transformation unit 107.

Incidentally, in the operation of pattern search apparatus 101, with respect to a similar process to that of pattern search apparatus 1 of the first embodiment, a description thereof will be omitted.

Orthogonal transformation unit 107 has previously performed principal component analysis of a training pattern set as a retrieval object. Eigenvectors up to the Nth one for performing orthogonal transformation in descending order of eigenvalue, that is, an "N×D" orthogonal transformation matrix $O = \{\phi^T_1, \phi^T_2, \cdots \phi^T_N\}$ is stored and is sent to storage unit 102.

Storage unit 102 uses the eigenvector acquired by orthogonal transformation unit 107, and orthogonally transforms each in the training pattern set as the retrieval object in advance, and then stores it as the training pattern set.

Then, the orthogonally transformed training pattern set is sent to distribution acquisition unit 103 and training unit 105.

Distribution acquisition unit 103 obtains a cumulative probability distribution on each axis of the training pattern set stored by storage unit 102.

Here, the cumulative probability distribution is made a general distribution, and the general distribution is assumed to be the Gaussian distribution, and is estimated by weighting addition of the sigmoid function. Actually, with respect to training patterns selected at random, h in each of the training patterns is optimized by following expression (7), and the cumulative probability distribution is made a function by the least squares approximation.

$$f(x) = \frac{1}{nh'} \sum_{i=1}^{n} Ps\left(\frac{x - x_i}{h_i}\right) \tag{7}$$

$$Ps(x) = \frac{1}{1 + e^{-x}}$$

Here, h' is a mean value of $h_i$. The number of n is given as a constant, or the minimum number within the allowable range of approximation accuracy is obtained by a general optimization method.

First, an unknown input pattern q, such as a face image, to be retrieved is inputted to search unit 106. A search is made for the nearest neighbor pattern in the training pattern set ALL with respect to the input pattern q. This search is made based on each hash function acquired by hash function unit 104 and the subset generated by training unit 105.

The input pattern is orthogonally transformed by the eigenvector acquired by orthogonal transformation unit 107, and is made an orthogonal transformation pattern $O^T q$. When the orthogonal input pattern is made an input value, a subset $B_{iH}$ limited by the hash value H as the output of the hash function can be defined by following expression (8).

$$B_{iH} = \{x | x \in ALL, h_i(x) = H\} \tag{8}$$

Here, a sum of subsets obtained by m hash functions selected at random is made the nearest neighbor candidate C(q)

$$C(q) = \bigcup_{i=1}^{m} B_{iH}(\varphi_i^T q) \tag{9}$$

At this time, when the nearest neighbor candidate C(q) is acquired, the number of contained buckets is made a multiplicity w(x), sorting is made by this, and a distance between the maximum pattern and the input pattern is made a provisional distance z. When an $L_p$ distance between $x_1$ and $x_2$ is defined as $d_p(x_1, x_2)$, the provisional distance z is expressed by following expression (10).

$$z = d\left(q, \arg\max_{x \in C(q)} w(x)\right) \tag{10}$$

Here, since a candidate x satisfying following expression (11) can not become the nearest neighbor, the candidate can be removed from the nearest neighbor candidate C(q).

$$\sum_{i=1}^{m} |\varphi_i^T q_i - \varphi_i^T x_i|^p > z^p \tag{11}$$

Based on this property, a search refinement is performed by the following procedure in sequence from a projection component on a principal axis with a high eigenvalue.

At step 1, i is made 1.

At step 2, with respect to each element in $C_{i-1}(q)$, a candidate satisfying the condition of expression (11) is removed, and the obtained candidate set is made $C_i(q)$. When i=m, advance is made to step 4. When $|C_i(q)|=1$, the element is made the nearest neighbor pattern and a stop is made.

At step 3, i is made "i+1" and return is made to step 2.

At step 4, distance calculation is performed for all candidates in $C_i(q)$ and the input pattern, and the training pattern to give the minimum distance is made the nearest neighbor pattern and a stop is made.

The reason why such calculation is performed is that the first principal component with the highest eigenvalue is the axis with the largest dispersion, and almost all elements of $C(q) - B_{1h1(q)}$ satisfy the condition of $|\phi^T_1 q - \phi^T x|^p > z^p$, and therefore, the nearest neighbor candidate set can be made small at one stroke only by checking the value of $\phi^T_1 q_1$. Since the same can apply to the second and subsequent principal element when compared with the subsequent principal axis, when consideration is made to the efficiency of refining the candidate, it can be said that the process is appropriate.

The finally acquired nearest neighbor pattern is outputted to the outside of the pattern search apparatus 1.

(Third Embodiment)

A pattern search apparatus 201 of a third embodiment of the invention will be described with reference to FIG. 4.

Pattern recognition apparatus 201 of this embodiment is different from pattern search apparatus 1 of the first embodiment and pattern search apparatus 101 of the second embodiment in the following points.

The first different point is that pattern recognition apparatus 201 has previously stored a training pattern set which becomes a retrieval object and makes it a training pattern set. A class corresponding to this training pattern set is stored, a nearest neighbor pattern is searched by a pattern search unit 208 with respect to an input pattern, and a corresponding class outputted by a class unit 209 is outputted as a recognition result.

The second different point is that pattern search unit 208 acquires a cumulative histogram based on a value on a dimensional axis on which a pattern is acquired by a distribution acquisition unit 203, and makes it a cumulative probability distribution.

Figure 4:
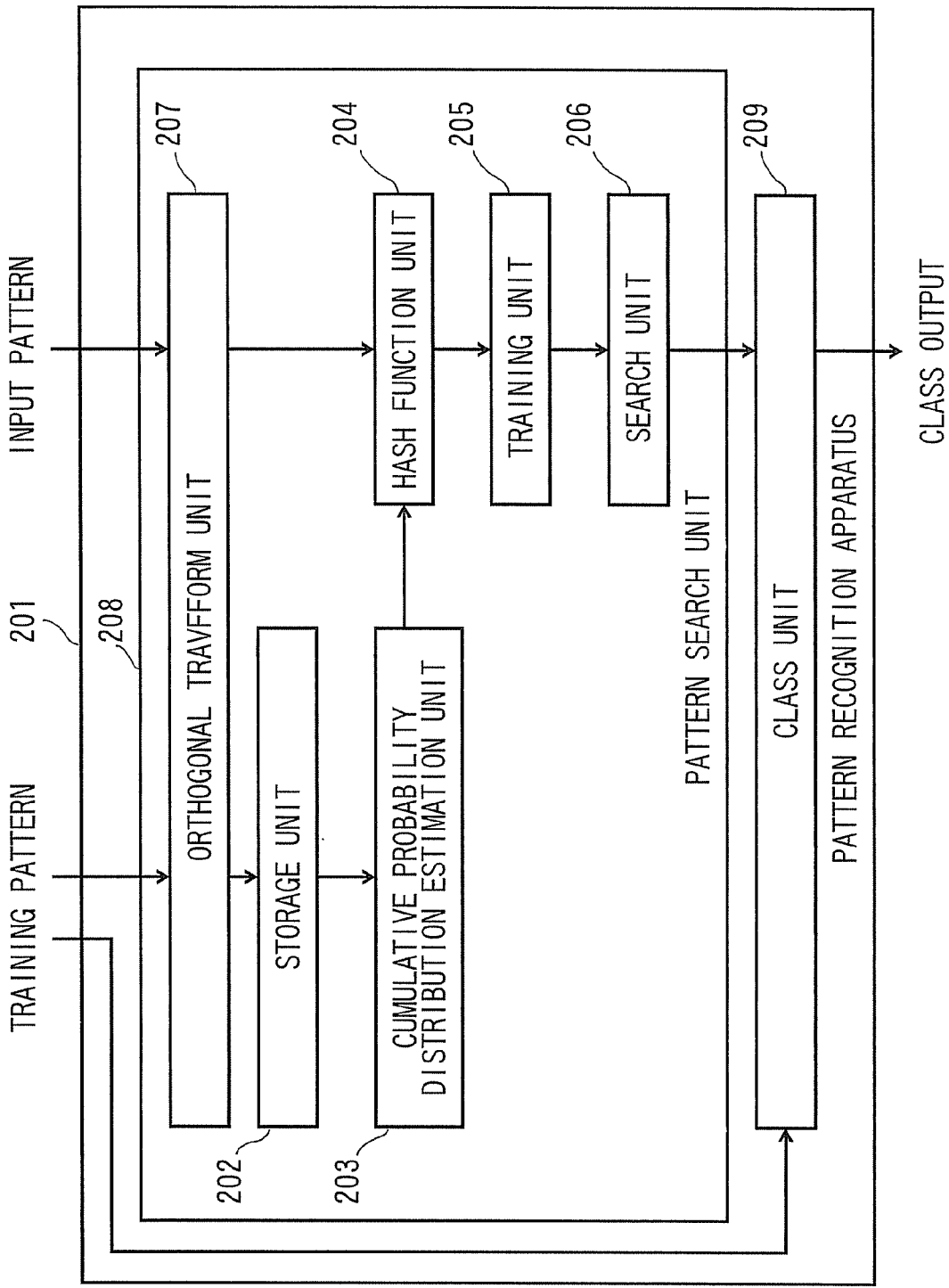
FIG. 4 is a block diagram showing a structure of a pattern search apparatus of a third embodiment of the invention.
Figure 5:
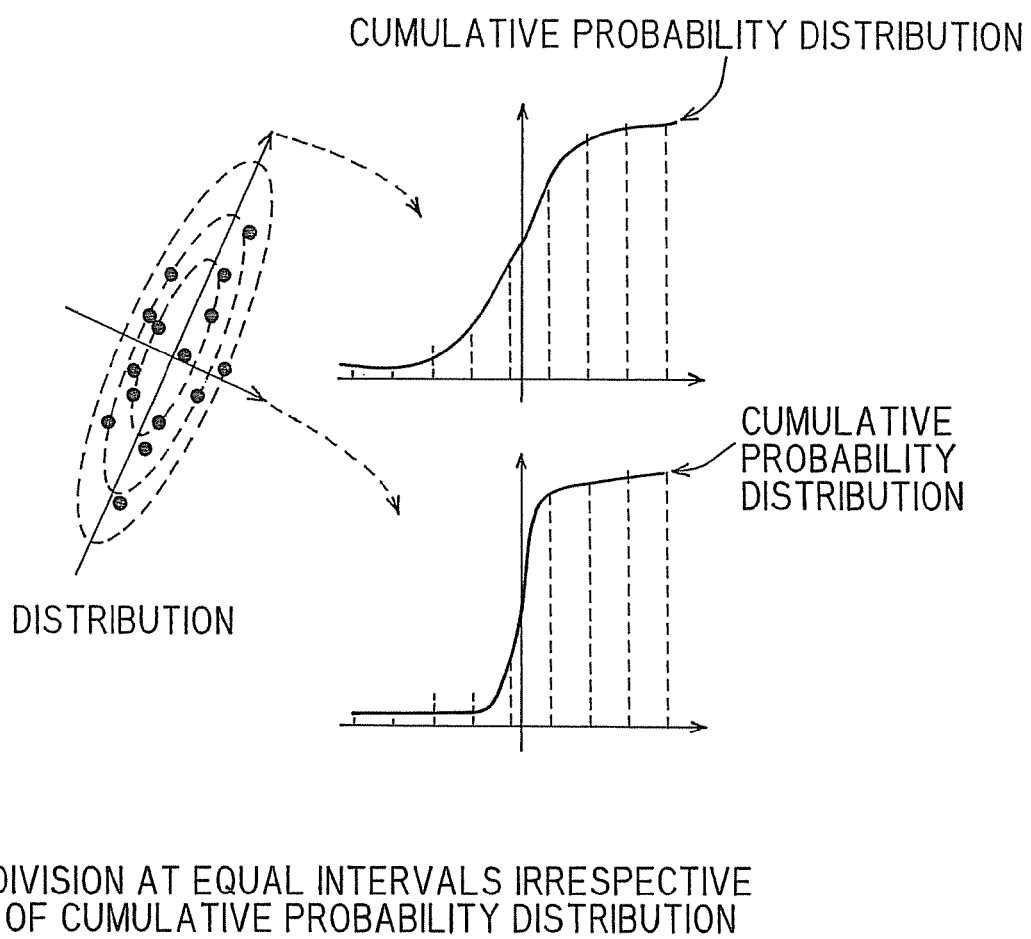
FIG. 5 is an explanatory view of the concept of the related art.

FIG. 4 is a block diagram showing pattern recognition apparatus 201 of this embodiment.

Pattern recognition apparatus 201 includes a storage unit 202, distribution acquisition unit 203, a hash function unit 204, a training unit 205, a search unit 206, an orthogonal transformation unit 207, pattern search unit 208, and class unit 209.

Incidentally, in the operation of pattern recognition apparatus 201, with respect to a similar process to that of pattern search apparatus 1 of the first embodiment and that of pattern search apparatus 101 of the second embodiment, a description thereof will be omitted.

Distribution acquisition unit 203 acquires a cumulative probability distribution on each axis of a training pattern set stored in storage unit 202. Here, rearrangement is performed by a value on each axis of the training pattern set to obtain a cumulative histogram and the cumulative probability distribution is estimated.

A difference from the distribution expression using the function in the respective embodiments is that it can be uniquely obtained since there is no optimization parameter, however, when the number of the training patterns is small, since a distribution between the training patterns is represented linearly, an error becomes large.

Pattern search unit 208 includes storage unit 202, distribution acquisition unit 203, hash function unit 204, training unit 205, search unit 206, and orthogonal transformation unit 207, and searches the nearest neighbor pattern of the input pattern from the training pattern set stored in storage unit 202.

Class unit 209 registers a class corresponding to each of the patterns in the training pattern set, and outputs, as the class of the input pattern, the class corresponding to the nearest neighbor pattern of the input pattern searched by pattern search unit 208 to the outside of pattern search apparatus 1.

Incidentally, the present invention is not limited to the embodiments as described above, and the components can be modified and embodied within the scope not departing from the gist in an implementation phase.

Besides, various inventions can be formed by appropriate combinations of components disclosed in the embodiments. For example, some components may be deleted from all components disclosed in the embodiment. Further, components of different embodiments may be appropriately combined.

What is claimed is:

1. A pattern search apparatus comprising:
a computing system that executes computer-executable components stored in a non-transitory memory, the computer-executable components comprising:
a storage unit configured to store a plurality of training patterns having d dimensions, where d is an integer;
a distribution acquisition unit configured to obtain a cumulative probability distribution representing a cumulative probability of existing probabilities of the plurality of training patterns on an arbitrary dimensional axis of the d dimensions;
a hash function unit configured to obtain a hash function to convert a value of an arbitrary point in a distribution section on the arbitrary dimensional axis corresponding to, in the cumulative probability distribution of the d dimensions, each of a plurality of probability sections which are obtained by dividing the cumulative probability distribution so that cumulative probability values of the plurality of probability sections become uniform in each dimension of the d dimensions, to a hash value corresponding to each of the plurality of probability sections;
a training unit configured to obtain hash values of respective training patterns in the plurality of training patterns by using the hash function and to classify the respective training patterns into one or more buckets corresponding to the hash values; and
a search unit configured to obtain a hash value of an input pattern by using the hash function and to perform a search of a training pattern most similar to the input pattern from a subset of the respective training patterns belonging to a bucket, of the one or more buckets, corresponding to the hash value of the input pattern.

2. The apparatus according to claim 1, wherein the distribution acquisition unit is further configured to assume that a distribution of the plurality of training patterns is a normal distribution, and to approximate the cumulative probability distribution by a sigmoid function.

3. The apparatus according to claim 1, wherein the distribution acquisition unit is further configured to approximate the cumulative probability distribution by weighting addition of functions.

4. The apparatus according to claim 1, wherein the distribution acquisition unit is further configured to acquire a cumulative histogram by values of the plurality of training patterns with respect to the dimensional axis, and to make the cumulative histogram the cumulative probability distribution.

5. The apparatus according to claim 1, the computer-executable components further comprising an orthogonal transformation unit configured to project at least one of the plurality of training patterns on a subspace and to orthogonally transform the at least one of the plurality of training patterns into a Euclidean distance in a vector space to yield an orthogonally transformed training pattern,
wherein the storage unit is further configured to store the orthogonally transformed training pattern.

6. The apparatus according to claim 5, wherein the orthogonal transformation unit is further configured to orthogonally transform the at least one of the plurality of training patterns by principal component analysis.

7. The apparatus according to claim 1, wherein
the distribution acquisition unit is further configured to obtain the cumulative probability distribution on each of an arbitrary plurality of dimensional axes in the d dimensions to yield obtained cumulative probability distributions, the hash function unit is further configured to obtain respective hash functions for the obtained cumulative probability distributions, the training unit is further configured to obtain hash values of the plurality of training patterns by using the respective hash functions, and to classify the plurality of training patterns as buckets corresponding to the respective hash values to yield classified training patterns, and the search unit is further configured to perform the search from a sum of the classified training patterns in each of the buckets.

8. The apparatus according to claim 7, wherein the search unit is further configured to obtain a number of times each of the subset of the plurality of training patterns for which the number of times is above a threshold value.

9. The apparatus according to claim 1, wherein the distribution acquisition unit is further configured to obtain the cumulative probability distribution on each of an arbitrary plurality of dimensional axes in the d dimensions to yield obtained cumulative probability distributions, the hash function unit is further configured to obtain respective hash functions for the obtained cumulative probability distributions, the training unit is further configured to obtain hash values of the plurality of training patterns by using the respective hash functions, and to classify the plurality of training patterns as buckets corresponding to the respective hash values to yield classified training patterns, and the search unit is further configured to perform the search from a product set of the classified training patterns in each of the buckets or a vicinity of the product set.

10. A pattern search method comprising:

executing, by a computer, computer-executable instructions that cause the computer to perform operations, comprising:

storing a plurality of training patterns having d dimensions, where d is an integer;

obtaining a cumulative probability distribution representing a cumulative probability of existing probabilities of the plurality of training patterns on an arbitrary dimensional axis of the d dimensions;

obtaining a hash function to convert a value of an arbitrary point in a distribution section on the arbitrary dimensional axis corresponding to, in the cumulative probability distribution, of the d dimensions, each of a plurality of probability sections which are obtained by dividing the cumulative probability distribution so that cumulative probability values of the plurality of probability sections are uniform in each dimension of the d dimensions, to a hash value corresponding to each of the probability sections;

obtaining hash values of respective training patterns of the plurality of training patterns by using the hash function and classifying the respective training patterns as one or more buckets corresponding to the hash values; and obtaining a hash value of an input pattern by using the hash function and searching a training pattern most similar to the input pattern from a subset of the respective training patterns belonging to a bucket, of the one or more buckets, corresponding to the hash value of the input pattern.

11. A program stored in a non-transitory medium capable of being read by a computer and causing the computer to implement functions including:

storing a plurality of d-dimensional training patterns, where d is an integer;

obtaining a cumulative probability distribution representing a cumulative probability of existing probabilities of respective training patterns of the d-dimensional training patterns on an arbitrary dimensional axis of d dimensions;

obtaining a hash function to convert a value of an arbitrary point in a distribution section on the arbitrary dimensional axis corresponding to, in the cumulative probability distribution of the d dimensions, each of a plurality of probability sections which are obtained by dividing the cumulative probability so that cumulative probability values of the plurality of probability sections become uniform in each dimension of the d dimensions, to a hash value corresponding to each of the plurality of probability sections;

obtaining hash values of the respective training patterns by using the hash function and classifying the respective training patterns into one or more buckets corresponding to the hash values; and obtaining a hash value of an input pattern by using the hash function and searching a training pattern most similar to the input pattern from a subset of the respective training patterns belonging to a bucket, of the one or more buckets, corresponding to the hash value of the input pattern.

* * * * *